US007629996B2

(12) United States Patent
Rademacher et al.

(10) Patent No.: US 7,629,996 B2
(45) Date of Patent: Dec. 8, 2009

(54) INDUSTRIAL TRUCK WITH A CAMERA DEVICE

(75) Inventors: Frank Rademacher, Hamburg (DE); Rainer Bavendiek, Wentorf (DE); Wolfgang Buchholz, Bad Oldesloe (DE); Franz-Josef Arping, Hamburg (DE); Oliver Jandke, Hamburg (DE); Patrick Arand, Hamburg (DE)

(73) Assignee: Still GmbH, Hamburg (DE)

( * ) Notice: Subject to any disclaimer, the term of this patent is extended or adjusted under 35 U.S.C. 154(b) by 497 days.

(21) Appl. No.: 09/809,405

(22) Filed: Mar. 15, 2001

(65) Prior Publication Data

US 2001/0022616 A1 Sep. 20, 2001

(30) Foreign Application Priority Data

Mar. 15, 2000 (DE) ................................ 100 12 525

(51) Int. Cl.
*H04N 7/18* (2006.01)
*G03B 17/00* (2006.01)

(52) U.S. Cl. ....................................... 348/148; 396/421

(58) Field of Classification Search ................. 348/148, 348/149, 113, 115, 118, 142, 145, 151, 143, 348/104, 103, 373, 159; 340/937; 382/104, 382/103; 396/421, 428, 419; 701/50
See application file for complete search history.

(56) References Cited

U.S. PATENT DOCUMENTS 4,566,032 A * 1/1986 Hirooka et al. ............. 348/119
5,542,490 A * 8/1996 Kemshall et al. ............ 180/422
5,680,123 A 10/1997 Lee
5,793,308 A * 8/1998 Rosinski et al. ............. 340/903
5,938,710 A * 8/1999 Lanza et al. .................. 701/50
6,079,935 A * 6/2000 Brunner et al. ............. 414/641
6,222,447 B1 * 4/2001 Schofield et al. ............ 340/461
6,276,750 B1 * 8/2001 Frisch ..................... 296/190.1
6,611,202 B2 * 8/2003 Schofield et al. ............ 340/461
6,693,524 B1 * 2/2004 Payne ......................... 340/463
2003/0214415 A1 * 11/2003 Shaw ......................... 340/685

FOREIGN PATENT DOCUMENTS

DE 83 08 363.4 9/1983

(Continued)

OTHER PUBLICATIONS

Flurforderzeuge, dhf 5/94, p. 41.

(Continued)

*Primary Examiner*—Behrooz Senfi
(74) *Attorney, Agent, or Firm*—The Webb Law Firm

(57) ABSTRACT

An industrial truck, in particular a fork lift truck, has a driver's seat that is oriented in the forward direction, at least one screen that is located in the vicinity of the driver's seat, a first camera pointing toward the rear of the industrial truck and at least one additional camera that is directed toward the rear. The first camera is provided to view a distant area and the additional camera is provided to view a near area behind the industrial truck. The image taken with the first camera and/or the image taken with the additional camera can be displayed on the screen. There are advantageously two additional cameras to view the near area.

14 Claims, 3 Drawing Sheets

FOREIGN PATENT DOCUMENTS

| | | | |
|---|---|---|---|
| DE | 36 24 486 | A1 | 1/1988 |
| DE | 297 05 054 | U1 | 7/1997 |
| DE | 196 38 140 | A1 | 3/1998 |
| DE | 198 16 054 | A1 | 10/1998 |
| DE | 198 15 124 | A1 | 10/1999 |
| DE | 199 23 964 | A1 | 12/1999 |
| DE | 199 25 131 | A1 | 12/2000 |
| EP | 254192 | A2 * | 1/1988 |
| EP | 0 949 189 | A2 | 10/1999 |
| WO | WO98/15427 | | 4/1998 |

OTHER PUBLICATIONS

Japanese Abstract M-971, May 10, 1990, vol. 14/No. 221.
Japanese Abstract M-283, Mar. 15, 1984, vol. 8/No. 57.

* cited by examiner

INDUSTRIAL TRUCK WITH A CAMERA DEVICE

BACKGROUND OF THE INVENTION

1. Field of the Invention

This invention relates to an industrial truck, such as a fork lift truck, having a driver's seat that is oriented in the forward-facing direction, at least one screen that is located in the vicinity of the driver's seat and a first camera that is directed toward the rear of the industrial truck. In particular, according to the invention at least one additional camera is provided, directed toward the rear, whereby the images taken with the cameras can be displayed on the screen.

2. Brief Description of the Prior Art

An industrial truck according to the prior art is described in German Patent No. 198 15 124 A1, for example.

On industrial trucks of the type described, travel in reverse is made easier for the driver by the fact that the area behind the industrial truck is viewed by the camera and displayed on the screen. The driver thereby does not need to turn his head, an action that is necessary on conventional industrial trucks the whole time the truck is traveling in reverse and that places significant stress on the driver's spinal column.

The screens used can be conventional cathode ray tubes or flat screens. It is also possible to use virtual screens, such as a heads-up display or an LCD screen that is integrated into the windshield of the industrial truck.

One problem with industrial trucks of the prior art that are equipped with a camera and screen to facilitate travel in reverse is that the camera cannot view the entire area behind the industrial truck. In particular, the near area, i.e., the area directly behind the industrial truck, is not visible on the monitor screen. Even equipping the camera with an extreme wide-angle lens cannot completely eliminate this problem, because in that case, the image displayed on the screen is severely distorted in the peripheral areas, which means that the driver cannot navigate solely on the basis of the image displayed on the screen.

The object of the invention is therefore to make available an industrial truck that makes a sufficient segment of the image available on the screen when the industrial truck is traveling in reverse.

SUMMARY OF THE INVENTION

According to the invention, an industrial truck, and in particular a fork lift truck, has a driver's seat that is oriented in the forward direction, at least one screen that is located in the vicinity of the driver's seat and a first camera pointing toward the rear of the industrial truck.

The invention teaches that there is at least one additional camera that points toward the rear, whereby the first camera is provided to view a distant area and the additional camera is provided to view a near area behind the industrial truck, and whereby the image recorded by the first camera and/or the additional camera can be displayed on the screen.

It is particularly advantageous if there are two additional cameras that can be used to view the near area. It thereby becomes possible to completely eliminate any blind spots behind the industrial truck that cannot be viewed with the cameras.

The at least one additional camera to view the near area may be appropriately equipped with a wide-angle lens.

The display is effectively connected to a switching device, by which the distant area that can be viewed with the first camera or the near area that can be viewed with the at least one additional camera can be displayed on the screen as desired or as most appropriate. The switching device can be actuated manually by the driver of the industrial truck. During reverse travel in relatively wide-open spaces, it is appropriate for the driver to select the view of the distant area. On the other hand, when the industrial truck is a fork lift truck being operated in narrow spaces inside a warehouse, for example, the driver can observe the near area behind the fork lift truck on the screen.

The driver obtains a particularly good overview of the near area behind the fork lift truck if the screen is effectively connected with an image mixer, by which the images taken with the two additional cameras can be superimposed on each other and displayed on the screen. The images taken with the two cameras that view the near area are thereby combined so that the driver gets the impression that the image has been taken with one single camera.

It is also possible that the screen can be effectively connected with an image mixer, by which the near area viewed by the first camera and the distant area viewed by the at least one additional camera can be displayed on the screen simultaneously. There is no need to switch manually between the near and distant areas, because with this type of arrangement the driver can observe both views simultaneously and next to each other on the screen.

The first camera is appropriately located in the area behind the driver's cab. The first camera can be mounted on the upper side of a rear counterweight of a fork lift truck, for example, and thereby has a field of vision similar to that of a driver seated on the driver's seat and turned toward the rear.

It is also appropriate if each additional camera is fastened to an upper rear segment of the driver's cab. The rear columns of the driver's cab are appropriate sites for fastening these cameras. The additional cameras thereby have an angle of view from an elevated location, from which the entire near area behind the industrial truck is visible.

It is advantageous if the screen is located inside the driver's cab in the vicinity of the legroom for the driver. For example, the screen can be located between the driver's legs in the forward portion of the driver's cab. The screen thereby does not interfere with the driver's view or access to the display and control elements in the vicinity of the dashboard.

It is advantageous if the industrial truck has a steering device with an electrical steering sensor. Steering sensors of this type do not require a steering column, which would interfere with the installation of the screen in the area between the driver's legs.

In one particularly advantageous embodiment, the electrical steering sensor is located in the vicinity of an armrest of the driver's seat. All the installation space available in front of the driver's seat is thereby available for the installation of the screen. Even after the steering is actuated, the driver's arm does not interfere with the view on the screen.

The amount of space occupied by the screen can be reduced to a minimum by realizing the screen in the form of a flat screen.

BRIEF DESCRIPTION OF THE DRAWINGS

Additional advantages and details of the invention are explained in greater detail below, with reference to the exemplary embodiment illustrated in the accompanying drawings in which.

DETAILED DESCRIPTION OF THE PREFERRED EMBODIMENT

Figure 1:
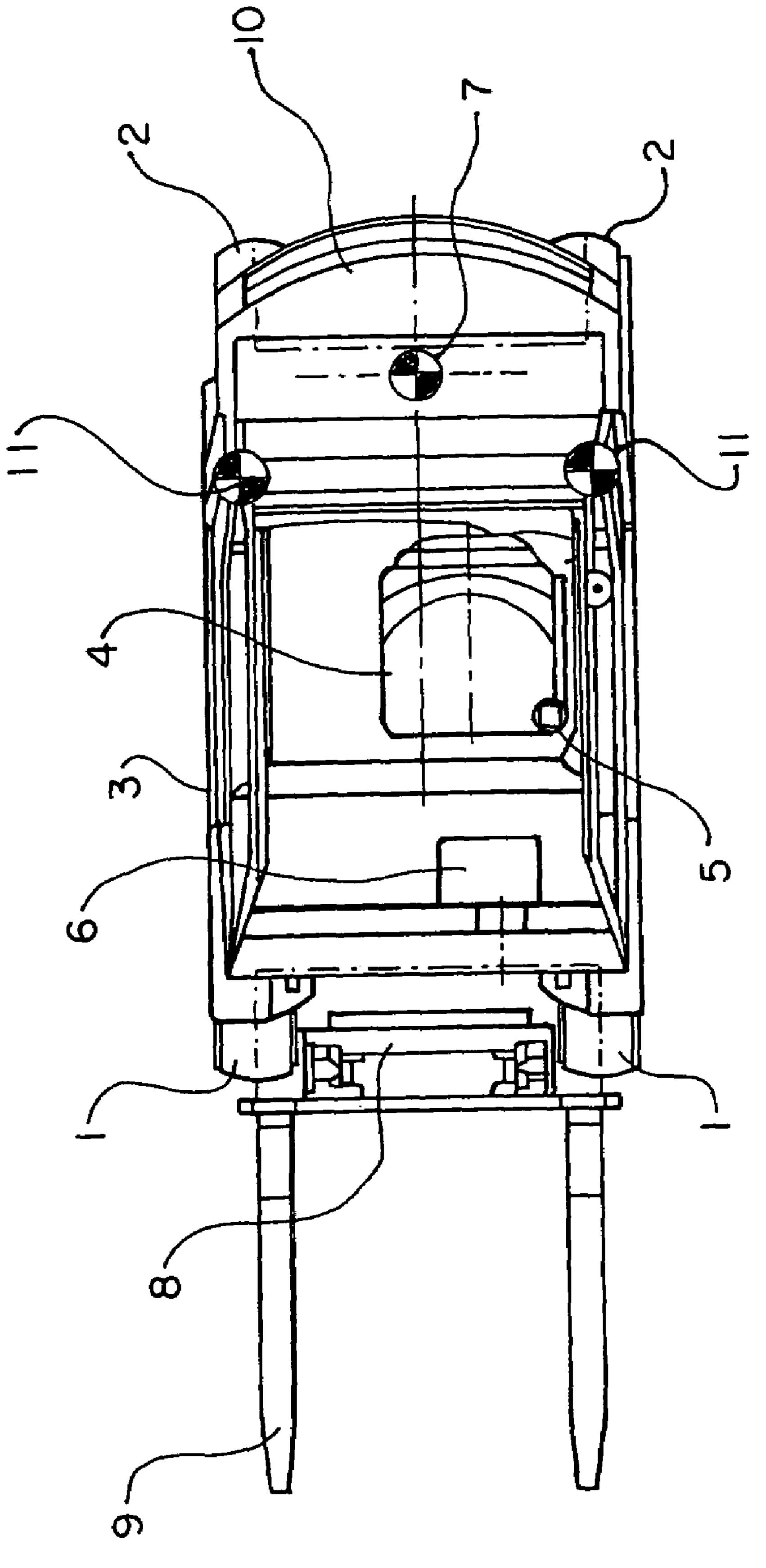
FIG. 1 is a top plan view of an industrial truck in the form of a fork lift truck according to the invention.

FIG. 1 shows an industrial truck according to the invention in the form of an overhead view of a fork lift truck. The industrial truck stands on the road or floor on two front wheels 1 and two steered rear wheels 2. In front of the front wheels 1, there are elevatable cargo holders 9 located on a lifting platform 8. A rear counterweight 10 is located in the vicinity of the rear wheels 2. Located in a driver's cab 3 of the industrial truck is a driver's seat 4 that faces forward and a steering wheel 5 that is located in front of the driver's seat 4. In the legroom of the driver's cab, there is also a screen 6 on which one of the images taken with different cameras is displayed as desired or as appropriate.

A first camera 7 is fastened to the upper side of the rear counterweight 10 and is provided to view the distant area behind the fork lift truck. The direction of view of the camera 7 can be fixed. It is also possible, however, to provide a swiveling device for the camera 7, by which the angle of view of the camera 7 can be set by the driver by an electrical control, or automatically, e.g., as a function of the current steering angle.

The invention further teaches that there are two additional cameras 11 by which the near area directly behind the fork lift truck and to the sides of the rear counterweight 10 can be viewed. The additional cameras 11 are fastened to the top of the driver's cab 3. The angle of view of this camera 11 is directed diagonally downward.

Figure 2:
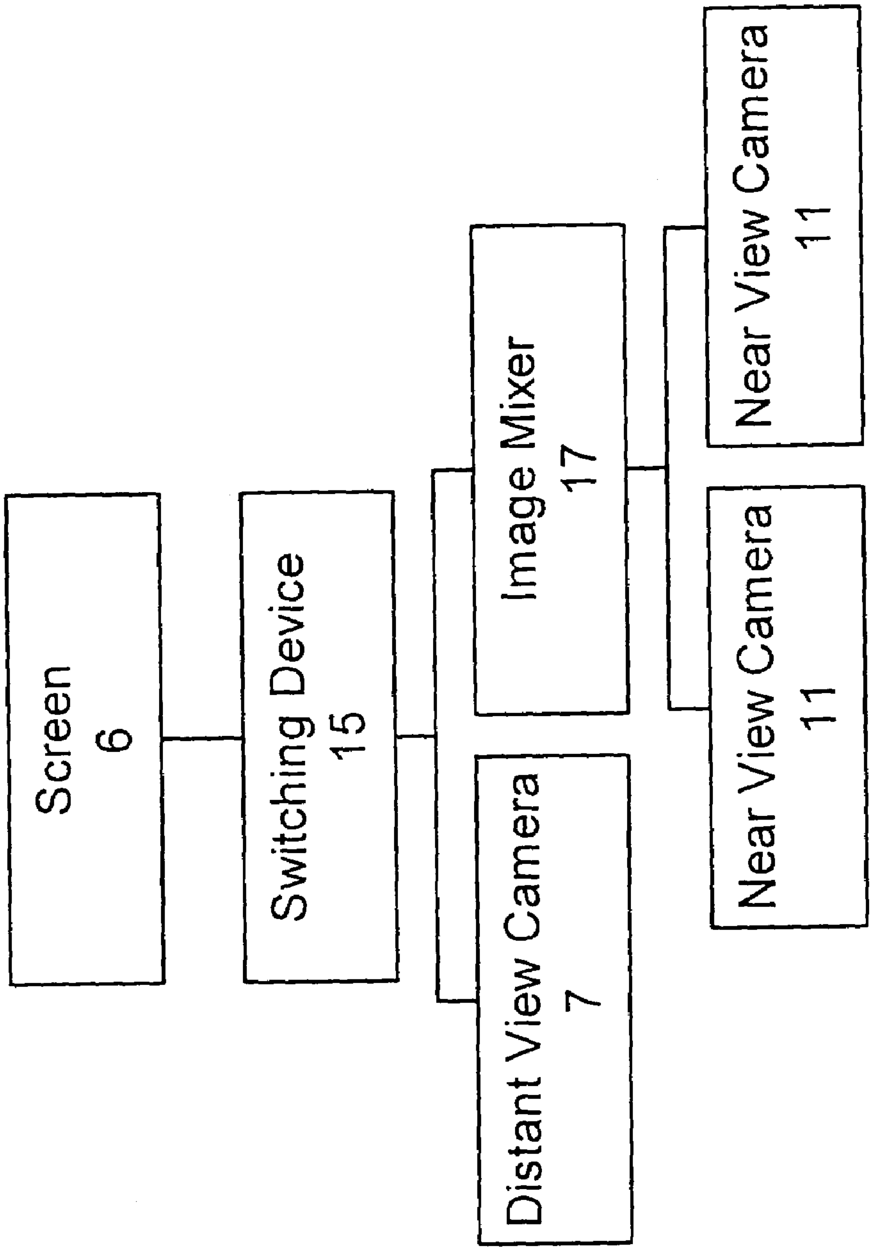
FIG. 2 is a schematic view of the rear vision system in the industrial truck according to the invention.
Figure 3:
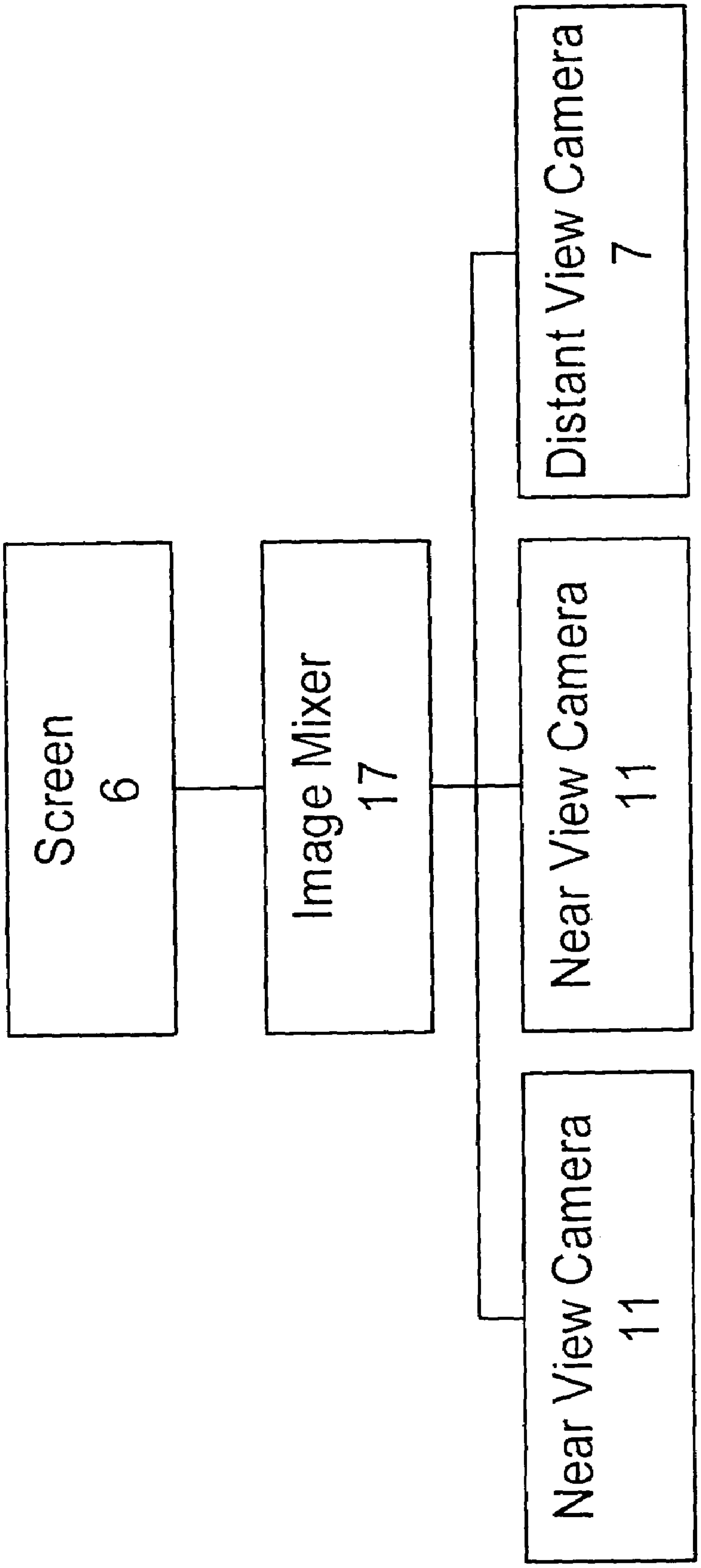
FIG. 3 is a schematic view of a modified rear view system according to the invention.

Located in the vicinity of the driver's cab 3 is a switching device 15, shown schematically in FIG. 2, by which the driver can optionally display a view of the near area or the far area on the screen 6. In the view of the near area on the screen, the images taken with the two additional cameras 11 are combined using an image mixer 17, shown schematically in FIG. 2, and partly superimposed so that the driver has the impression that he is looking at an image taken with a single camera. Alternatively, the switching device may be eliminated as shown in FIG. 3 if all of the cameras are coupled to an image mixer thereby showing one combined image on the screen 6.

Having described a presently preferred embodiment of the invention, it is to be understood that it may be otherwise embodied within the scope of the appended claims.

We claim:

1. An industrial truck comprising:

a driver's seat located in a driver's cab of an industrial truck, the driver's seat oriented in a forward direction;

at least one screen located in the vicinity of the driver's seat;

a counterweight located on a rear of the industrial truck;

a first camera pointing toward the rear, the first camera mounted on the rear of the industrial truck to the rear of the driver's seat and above the counterweight at a first height; and two additional cameras directed toward the rear of the industrial truck, wherein the two additional cameras are each mounted on the rear of the industrial truck to the rear of the driver's seat and on an upper segment of the driver's cab at a height greater than the first height, the two additional cameras being spaced outwardly from the first camera on opposing sides of the first camera and each having a diagonally downward directed angle of view, wherein the first camera provides a view of a distant area and the two additional cameras provide a view of a near area behind the industrial truck, and wherein the image taken with the first camera and/or the image taken with the two additional cameras can be displayed on the screens, wherein the screen is effectively connected with an image mixer by which the near area viewed by the first camera and the far area viewed by the two additional cameras can be displayed on the screen simultaneously.

2. An industrial truck as claimed in claim 1, wherein the two additional cameras are each equipped with a wide-angle lens to view the near area.

3. An industrial truck as claimed claim 1, wherein the screen is effectively connected with a switching device by which the far area viewed by the first camera or the near area viewed by the two additional cameras can be selectively displayed on the screen as desired.

4. An industrial truck as claimed claim 2, wherein the screen is effectively connected with a switching device by which the far area viewed by the first camera or the near area viewed by the two additional cameras can be selectively displayed on the screen as desired.

5. An industrial truck as claimed in claim 1, wherein the screen is effectively connected with an image mixer by which the images taken by the two additional cameras are superimposed on each other on the screen.

6. An industrial truck as claimed in claim 1, wherein the screen is located inside a driver's cab of the industrial truck in the vicinity of the legroom for the driver.

7. An industrial truck as claimed in claim 1, wherein the industrial truck has a steering device with an electrical steering sensor.

8. An industrial truck as claimed in claim 7, the electrical steering sensor is located in the vicinity of an armrest of the driver's seat.

9. An industrial truck as claimed in claim 1, wherein the screen is in the form of a flat screen.

10. An industrial truck as claimed in claim 1, wherein the industrial truck is in the form of a fork lift truck.

11. An industrial truck as claimed in claim 1, wherein each of the two additional cameras is mounted to a rear column of the driver's cab.

12. An industrial truck as claimed in claim 1, wherein the two additional cameras are mounted to a top of the driver's cab.

13. An industrial truck as claimed in claim 1, wherein the two additional cameras provide a view of a rear area directly behind the industrial truck.

14. An industrial truck as claimed in claim 1, wherein the two additional cameras provide a view of a rear area directly behind the counterweight of the industrial truck.

* * * * *

UNITED STATES PATENT AND TRADEMARK OFFICE

CERTIFICATE OF CORRECTION

PATENT NO. : 7,629,996 B2
APPLICATION NO. : 09/809405
DATED : December 8, 2009
INVENTOR(S) : Rademacher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this

Second Day of November, 2010

David J. Kappos

*Director of the United States Patent and Trademark Office*